United States Patent [19]
Luchtenberg et al.

[11] 4,032,068
[45] June 28, 1977

[54] THERMOSTATIC VALVE

[75] Inventors: Russell O. Luchtenberg, Hebron; James P. Buchwald, Mount Vernon, both of Ohio

[73] Assignee: Thermo Valve Corporation, Mount Vernon, Ohio

[22] Filed: Apr. 8, 1975

[21] Appl. No.: 566,101

[52] U.S. Cl. .............................. 236/34.5; 137/599; 165/35
[51] Int. Cl.² ......................................... F01P 7/02
[58] Field of Search ............. 165/35; 236/34.5, 93; 137/599, 599.1

[56] References Cited

UNITED STATES PATENTS

| | | | |
|---|---|---|---|
| 1,697,865 | 1/1929 | Hahn et al. | 137/599 |
| 2,720,214 | 10/1955 | Rupp et al. | 137/599 |
| 2,919,860 | 1/1960 | Wagner | 236/34.5 |
| 3,123,091 | 3/1964 | Elsey | 137/599 |
| 3,734,405 | 5/1973 | Wagner | 236/34.5 |

Primary Examiner—C. J. Husar
Assistant Examiner—Daniel J. O'Connor
Attorney, Agent, or Firm—Albert L. Ely, Jr.

[57] ABSTRACT

Body constructions for valves responsive to temperatures of inlet fluid so as to open or close thermostatic valve elements and, respectively, direct fluid flow to heat-exchangers or by-pass them. Flow is diverted from the axis of the inlet to permit ready access to thermostatic valves and/or improve flow to heat-exchangers.

10 Claims, 8 Drawing Figures

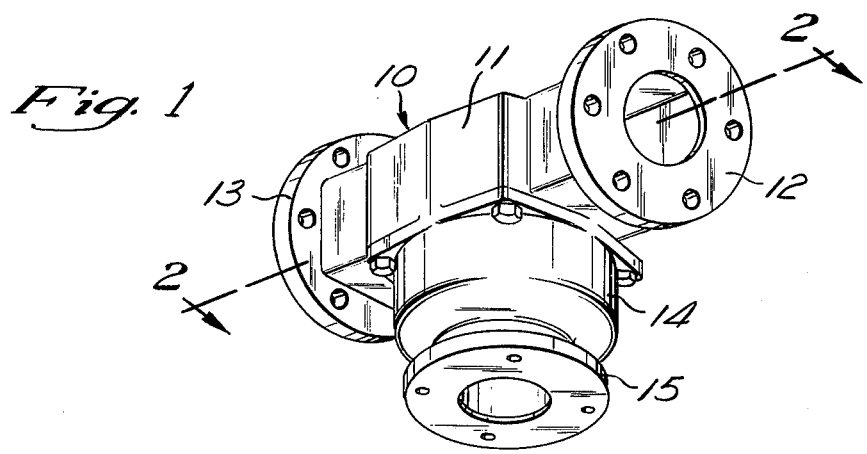
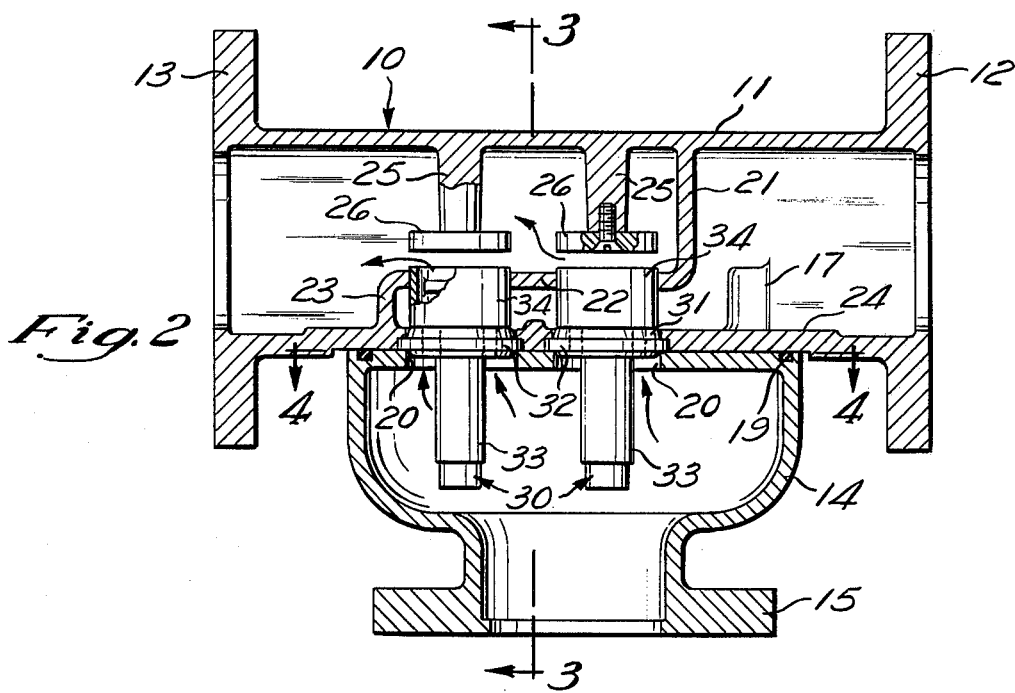
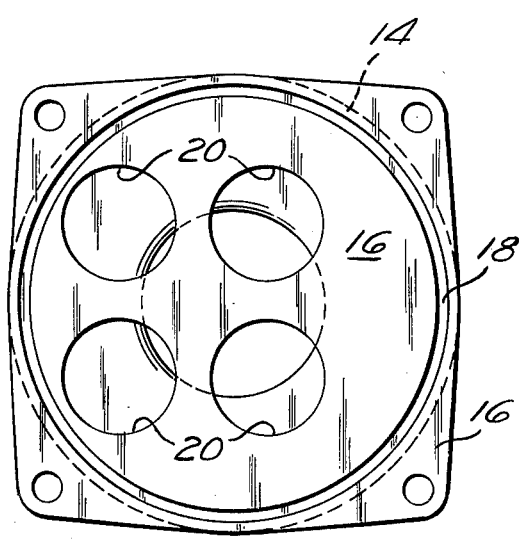
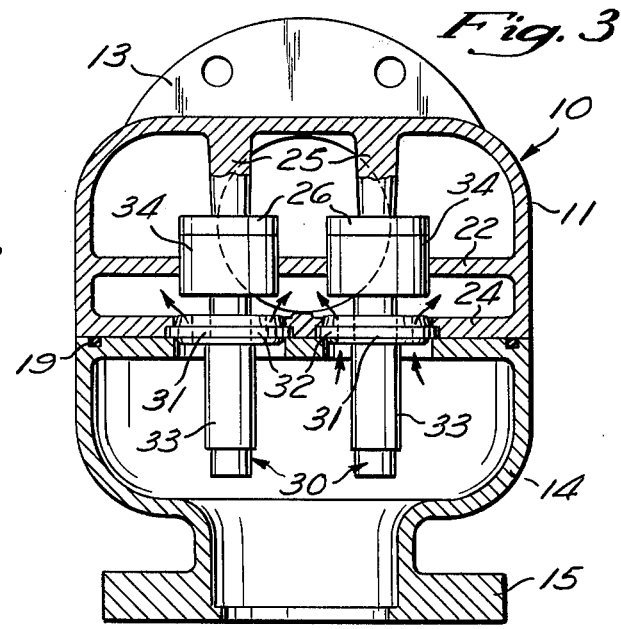

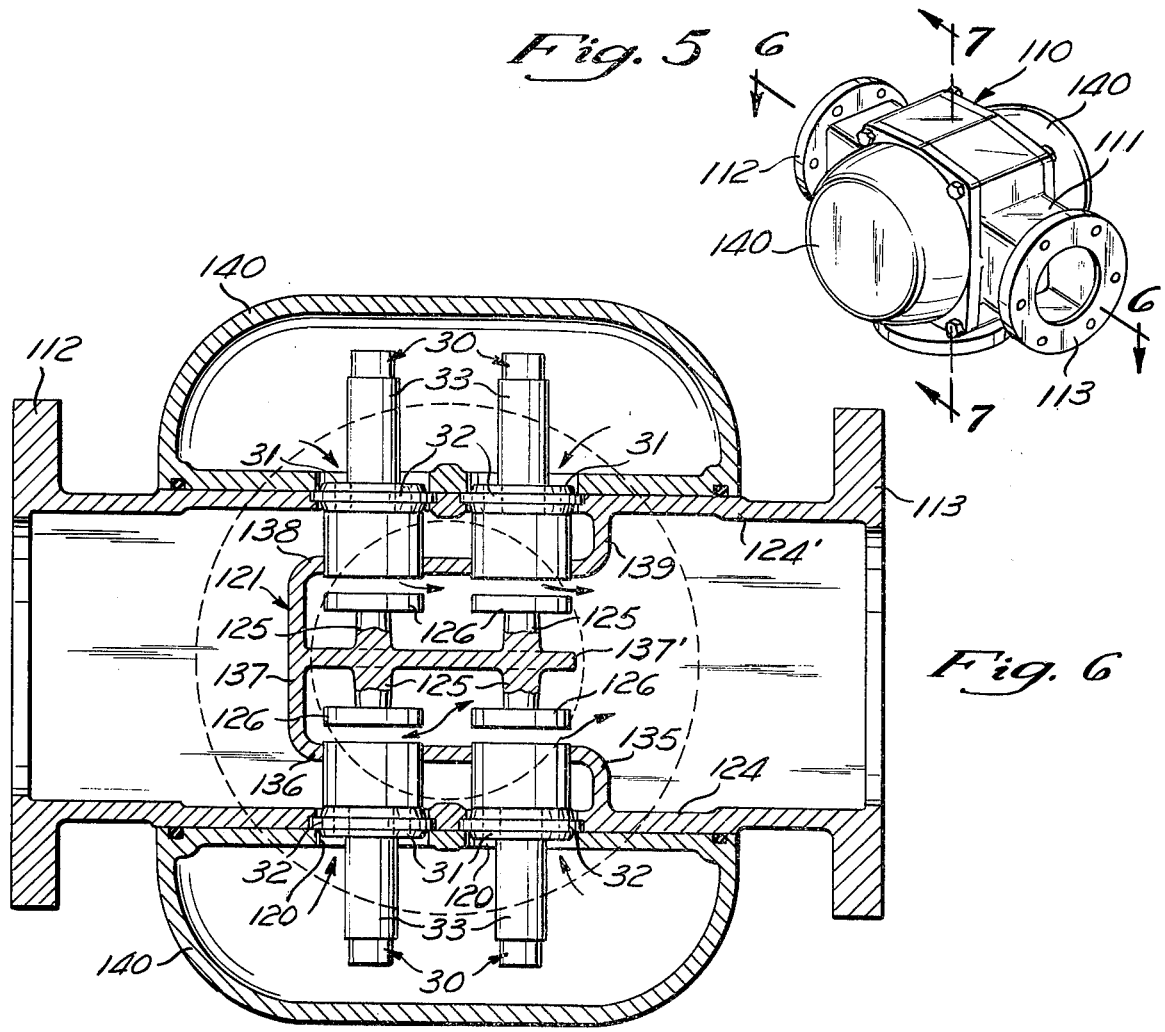
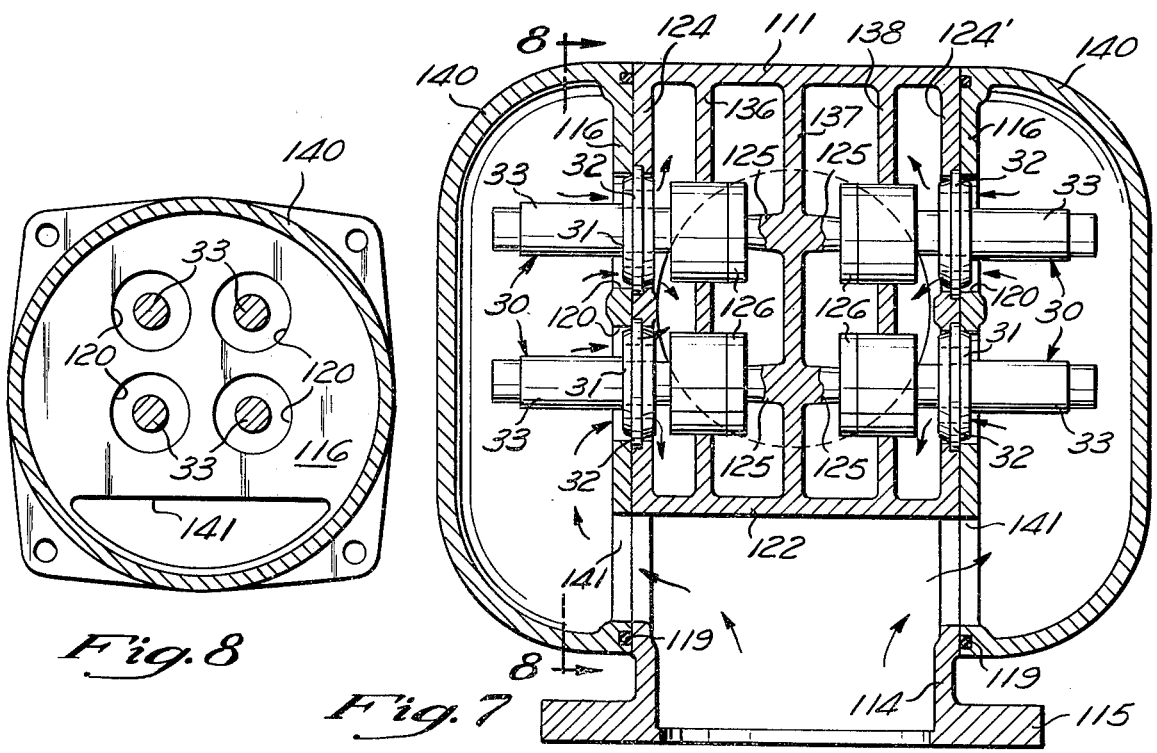

THERMOSTATIC VALVE

This invention relates to improvements in valve bodies utilizing stock conventional thermostatic valve elements whereby inlet fluids passing the thermostatic valve elements open and close them so as to regulate the temperature of outlet fluid by directing the flow to a heat-exchanger or to a by-pass of the heat-exchanger.

Valve bodies containing such stock thermostatic valve elements and performing the above temperature-regulating function are widely employed. A major field of use is in the cooling systems of internal combustion engines, particularly large diesel engines which are cooled by water or aqueous liquids circulated in the jackets for their cylinders. For their most efficient operation, such engines depend upon such a cooling liquid being quickly brought up to the minimum of a desired operating temperature range and thereafter being maintained within that fairly narrow range in the order of 10°-20° F. Other fields of use for valves embodying this invention, in addition to internal combustion engines (of the diesel and/or Otto-cycle types) are, for example, chemical processing equipment and systems, large electrical generator employing tubular conductors through which temperature-controlling liquids are circulated, and like equipment or installations requiring fairly close control of the temperature range of circulated or processed fluids. Such fluids are usually liquids but may include gases and vapors, provided the operating pressures do not exceed those for which the valves are designed and the fluids are not unduly corrosive of the material, usually metal, of which the valve body and its elements are made.

In order to take advantage of cost-saving inherent in using standard stock-sized thermostatic valve elements, it has been the prior art practice, followed in this invention, of using stock valve elements designed for small conduits and valve bodies requiring only a single element to control flow permitted by the capacity of the conduit; for larger conduits, a valve body containing a plurality of thermostatic valve elements, sufficient in number to accommodate the greater capacity of the larger conduit, is employed. It is in the latter multiple-element type of valve body that problems solved by this invention are accentuated. Thus, due to clogging, wear, or other existing or potential malfunction of the valve and valve element, proper maintenance of the equipment served by the valve requires that at least periodically the valve be "taken down", inspected for existing or potential correctable faults in the valve body and, particularly, the thermostatic valve element be inspected and replaced if necessary. Heretofore, such periodic inspections often required disconnecting and removing the entire valve from the lines to which it was connected while the equipment served by the valve was also shut down. Another and somewhat more subtle problem of the prior art thermostatic valve employing a plurality of valve elements arose from the fact that the stock thermostatic valve elements have a relatively short skirt with respect to the capacity of the larger conduits to which the valve is connected; consequently the limited "lift" of the valve element when in its open or "hot" position could constrict the height of the valve body passage into which the "hot" liquid is directed, a problem which was heretofore met only by increasing the number of valve elements used in the valve body.

It is an object and feature of this invention that, in the preferred embodiments, the interior of the valve body and the thermostatic valve element may be inspected and replaced without disconnecting the valve body from the conduits to which it is connected. The provides not only a major decrease in the labor and cost of periodic inspections and repairs of breakdowns between such inspections but also a decrease in the "down" time and loss of use of the equipment during such inspection and repairs.

Another object and advantage of this invention is that the valve body may be designed to minimize to minimize the constriction of flow of "hot" liquid through the valve to the heat-exchangers and, thereby, minimize the number of thermostatic valve elements required for a conduit of a given capacity.

Still another object and advantage of this invention is that the over-all dimensions may be held to the standard dimensions established for coupling a valve between the conduits leading to and from the valve body and, thereby, allow valves made according to this invention to be installed as replacements for prior art valves without special piping or couplings; also minimal bolts are required, reducing the initial cost of the valve and the cost of the time and labor involved in servicing it.

Still other and further objectives and advantages of this invention will be apparent from the following specification, claims, and drawings, in which:

FIG. 1 is a perspective of a smaller or medium size valve embodying some of the features of this invention.

FIG. 2 is a vertical section taken along the line 2—2 of the valve shown in FIG. 1, showing the thermostatic valve elements in a "cold" or closed position and with the skirt of one element partly broken away and the upper or "hot" seat of another valve element partly broken away.

FIG. 3 is a transverse section taken along the line 3—3 of FIG. 2, but showing the thermostatic valve elements in an open or "hot" position.

FIG. 4 is a plan view, taken along the line 4—4 of FIG. 3 showing the "deck" of an inlet nozzle by which four valve elements are retained in the valve body as shown in FIGS. 1-3.

FIG. 5 is a perspective of a larger size valve made according to this invention employing two clusters, each of four stock valve elements, to accommodate the capacity of the larger conduits, served by the valve.

FIG. 6 is a horizontal cross-section taken along the line 6—6 of FIG. 5.

FIG. 7 is a vertical section taken along the line 7—7 of FIG. 5.

FIG. 8 is an elevation taken along the line 8-8 of FIG. 7 to shown the "deck" that serves as a retainer for one of the clusters of four valve elements of the valve shown in FIG. 5.

Smaller Valve

Referring to the embodiment shown in FIGS. 1 through 4 of the drawings, the valve 10 is comprised of a main body 11 provided with standard end flanges 12 and 13. In the position shown, the flange 12 is bolted to a flange (not shown) of a conduit leading to a heat-exchanger, such as a radiator for a liquid-cooled diesel engine, for example. (In such a heat-exchanger, the fluid discharged through the opening of the flange 12 is normally cooled, under the maximum load and ambient temperature condition for which the exchanger is designed, to a temperature less than the desired maximum operating temperature.) Similarly, the flange 13 is bolted to a flange (not shown) for a pipe or like conduit which by-passes the heat-exchanger and leads directly to the source of heat, such as, for example, the water-jacket of a diesel engine. The faces of the flanges 12 and 13 are spaced from each other the standard distance established for thermostatic valves having gasketed flange connections between piping having an ID of the openings in the flanges 12 and 13 so that the valve 10 may replace conventional prior art valves without special fittings or adaptors.

In the position of the valve 10 shown in FIG. 1, there is bolted to the underside of the main valve body 11 a decked inlet fitting or nozzle 14 having a standard flange 15 corresponding to the flanges 12 and 13. The distance from the face of the flange 15 to the centerline of the flanges 12 and 13 is likewise the standard distance allowing the valve 10 to be connected to an inlet conduit centered between the outlet flanges 12 and 13 so that the entire valve 10 may replace a conventional prior art thermostatic valve and be connected without special piping or fittings to all three conduits for the inlet, heat-exchanger, and by-pass.

As best shown in FIGS. 1 and 4, the upper portion of the bell-shaped cavity in the inlet nozzle 14 is closed off by a substantially rectangular integral deck 16 providing four bracket areas drilled to permit bolting of the nozzle 14 to drilled and tapped bosses 17 within the cavity of the main body 11. The upper surface of the deck 16 is provided with a circular groove 18 substantially congruent with the wall of the bell-shaped portion of the nozzle 14 to receive a large O-ring 19. While the function of an O-ring as a seal, particularly between moving parts, is well-known, in this particular instance it was surprising that, with closely-finished mating planar surfaces of the main body 11 and the deck 16, the O-ring 19 compressed in the groove 18 provides a superior seal than a gasket, especially in that it permits a greater span between (and thus fewer) bolts by which the nozzle 14 is secured to the main body 11 and, consequently, minimizes the initial expense of drilling and tapping the body 11 for such bolts. This effective seal is believed to be probably due to the structural rigidity of the nozzle 14 in the location of the groove 18 and, thus, a relatively uniform compression of the O-ring 19 is obtained in all portions of the groove. The fewer bolts also permit quicker detachment of the nozzle 14 from the main body 11.

Referring to FIG. 4, it will be noted that the deck 16 of the nozzle 14 is drilled to provide four holes 20 which are each slightly smaller than the retaining flanges 32 of the "cold" ring seats 31 in the cluster of four stock thermostatic valve elements 30, described below. It will also be noted that while the entrance inlet through the flange 15 is concentric with the bell-shaped position of the nozzle 14, and, as stated above, is symmetrically located between the flanges 12 and 13, the grouping of the valve holes 20 is offset toward the by-pass flange 13 to improve flow toward the heat-exchange flange 12, as also explained below.

As best shown in FIGS. 2 and 3, the passage through the main body 11 between the openings of the flanges 12 and 13 is closed by a partition extending across the passage and having an upper vertical portion 21, a horizontal portion 22 extending toward the flange 13 beyond the openings 20 in the nozzle deck 16 to a lower portion 23 extending down to the base 24 of the main body 11 to which the nozzle 14 is bolted. The horizontal portion 22 and base 24 are drilled to provide holes which are coaxial with the holes 20 in the deck 16; the holes in the base 24 are counter-bored to a depth and diameter sufficient to receive the retaining flanges of the "cold" seats of thermostatic valve elements 30. Above each of holes 20 the interior of the body 22 is provided with integral posts 25, to each of these posts there is secured a horizontal "hot" seat 26 for the valve elements 30. The lower surface of each seat 26 is spaced above a valve element 30 when the latter is in its "cold" or closed position but contacts and closes the interior of a valve element 30 when it is lifted to its "hot" or open position.

Being stock "off-the-shelf" items, the precise details of construction of the thermostatic valve elements 30 are not the subject of this invention and various makes of such elements may vary in minor details. In general, however, the valve elements 30 each comprise a "cold" ring seat 31 having an outer flange 32 by which the element is secured in the counter-bore of the base of the body 11 by the edge of a hole 20 when the nozzle 14 is bolted to the body 11. Each ring seat 31 is provided with an internal spider or spokes (not shown) supporting a stem 33 in the center of which is located a thermo-responsive element, usually encapsulated wax, which expands and commences to lift the head of the valve from the "cold" ring seat 31 when fluid passing around the stem reaches the temperature for which the valve element is designed. The head of a valve element 30 is a thin-walled cylindrical skirt 34 having an internal spider or spokes by which it is lifted or lowered in response to the expansion or contraction of the thermo-responsive element in the stem 33.

Operation of the smaller valve

Assuming for sake of illustration that the valve 10 is designed to control the cooling water of a water-cooled diesel engine for which the optimum operating range is 175°–190° F., the valve elements 30 will be selected to commence to open at 175° F. and be fully opened at 190° F. Thus, when the engine is started and cooling water circulates through the valve 10, the water will be below the desired minimum temperature. Thus, the valve elements 30 being in their closed "cold" position as shown in FIG. 2, the inlet nozzle will pass such cooling water around the valve element stems 33, through the "cold" ring seats 31 and through the skirts 34 into the portion of the cavity of body 11 which is connected by the flange 13 to a by-pass leading directly back to the engine jacket. Circulation from the inlet nozzle 14 directly to the engine block by means of the by-pass will quickly raise the cooling water temperature above the 175° F. point at which the valve elements 30 commence to open; when the maximum temperature of 190° F. is reached, the valve skirts 34 will be seated against the "hot" seats 26, as shown in FIG. 3, forcing the cooling water through the "cold" ring seats 31 into the portion of the valve body 11 leading, due to the portions 21, 22, and 23, to the outlet through the flange 12 and thence to the heat-exchanger in which the water is cooled. Some thermostatic valve elements 30 may have a snap action so that the skirt 34 will either be fully opened or fully closed, but most commercially available elements will open or close gradually between the maximum and minimum temperature for which they are designed and, thus, under conditions of idling or moderate load on the engine, the valve elements 30 may float between fully opened and fully closed positions.

It will be noted that, due to the limited lift of the skirts 34 in most commercially available valve elements 30, the height of the horizontal portion 22 above the base 24 is correspondingly limited. It has been found that by offsetting the cluster of such elements, the flow to the heat-exchanger outlet is improved over that obtained if the cluster were centered in the nozzle 14.

For inspection and maintenance of the smaller valve shown in FIGS. 1 to 4, it may be necessary, depending upon the location of the valve dictated by the arrangement of piping and/or the design of the engine or equipment served by the valve, to disconnect all flanges 12, 13, and 15 before the nozzle 14 can be unbolted and removed from the main body 11 in order to remove and inspect the valve elements and the internal condition of the valve 10, particularly its seats 26 and the holes for the skirts 34 in the horizontal partition portion 22. In many instances, however, disconnection of the flange 15 from inlet piping and the nozzle 14 from the main body 11 will allow the nozzle 14 to be dropped down sufficiently to permit its removal and removal of the valve elements 30; in such situations, the interior of the valve may be quickly inspected and defective or questionable elements 30 replaced without disconnecting the flanges 12 and 13 of the main valve body 11.

Larger Valve

The use of a single cluster of stock thermostatic valve elements 30 having fixed and standarized dimensions (such as the lift of the valve skirts 34, the diameter of the ring seats 31 and the cross-section area of the passageways for the fluid through the valve elements, for example) for most practical purposes limits to piping or other conduits having a nominal ID in the order of four inches or less the smaller single cluster valves as shown in FIGS. 1 to 4 (particularly if the conventional spacings allowed for the flanges 12, 13, and 15 are to be met). However, there is a substantial demand for larger by-pass temperature-responsive thermostatic valves serving piping having nominal ID's in the order of six to eight inches or more. Heretofore, in prior art valves this demand for use with such larger piping has been met by increasing the number of stock valve elements in the cluster. Unfortunately, and despite the fact that conventional permissible spacing between inlet, by-pass, and heat-exchanger flanges and other over-all valve dimensions is increased for such larger piping, the expedient of simply increasing the number of valve elements in a cluster to accommodate the capacity of such larger piping encounters the obstacle that the space required for such a larger cluster increases the initial cost of the valve and also exceeds the conventional allowable over-all dimensions for such valves; this is due to the fact that the increase in capacity of larger clusters of more stock valve elements is merely linear, whereas the increase in the capacity of the larger piping intended to be served is proportional to the square of the nominal internal radius of such piping. That obstacle is overcome by the modification of this invention exemplified by the valve 110 shown in FIGS. 5 to 8 and described as follows:

The valve 110 is comprised of a main body 111 having an outlet to a heat-exchanger through the opening of a flange 112 and to a by-pass through the opening of a flange 113; an inlet is provided by an opening through an inlet flange 115 which, in this embodiment, is preferably integral with the main body 111. The axis of the inlet opening in the flange 115 is preferably perpendicular to the axis of the openings in the flanges 112 and 113. The inlet opening of the flange 115 leads to an inlet nozzle portion 114 which, however, is split, as described below.

In the position shown in FIGS. 5 to 7, the cavity of the main valve body 111 carries a multi-wall partition comprised of horizontal partition 122 that closes off the upper area of the inlet nozzle portion 114 and defines the lower area of the cavity which would extend from the openings of the flanges 112 and 113 but for a vertical multi-section partition 121 extending upwardly from the horizontal partition 122 to the top wall of the body 111 and transversely between its opposed vertical side walls 124 and 124'. The vertical partition 121 comprises a short transverse section 135 integral with the wall 124, a longitudinal section 136, an intermediate transverse section 137, a longitudinal section 138, and a short transverse section 139 integral with the body wall 124'. The transverse section 137 is provided with a central divider 137' carrying eight posts 125; four of which are located on each side of the divider 137'. Each post 125 is provided a "hot" seat 126.

On each of the body walls 124 and 124' there is mounted a bowl-shaped side chest 140 closed off by a substantially rectangular desk 116 having corner bracket portions drilled to permit the chests to be bolted to the main body 111. The outer surfaces of the decks 116 closely fit the outer surfaces of the side walls 124 and 124' to which they are bolted; these deck surfaces are also each provided with a groove receiving a large O-ring 119 which seals the chests to the side walls when the chests are bolted thereto.

The lower portion of each deck 116 is provided with an opening 141 mating with corresponding openings into the cavity of the inlet nozzle portion 114. The upper portion of each deck is drilled to provide holes 120 and corresponding coaxial holes are drilled on the body walls 124 and 124' and partitions 136 and 138. The holes in the walls 124 and 124' are counterbored to receive the flanges 32 of the ring seats of the thermostatic valve elements 30, whereby the bolting of the side chests 140 to the body 111 clamps a cluster of four valve elements 30 in place on each side of the body 111. As in the valve elements 30 employed in the embodiment of FIGS. 1 to 4, each element includes, in addition to a ring seat 31, a stem 33 enclosing a temperature responsive element and a hollow head having a skirt 34. In the embodiment shown in FIGS. 5 to 7, the stems 33 protrude into the side chests 140 and the skirts 34 slide in the holes aligned with the holes 20 in either the partition section 136 (for those carried in the wall 124) or the partition section 138 (for those carried in the wall 124') so as to seat on either the ring seats 31 or the seats 126 at either extreme of the operating temperature range for which the valve elements are designed.

Operation of the larger valve

As in the smaller valve shown in FIGS. 1 to 4, when an engine or equipment served by the larger valve of FIGS. 5 to 8 is started or running "cold", the cooling liquid passes into the inlet nozzle portion 114, where its flow splits and passes into the side chests 140 through openings 141; in each chest the cooling liquid then flows through the holes 120, ring seats 31, and skirts 34 into the space between the partition sections 136 and 138 and thence out of the opening in the by-pass flange 113 (see FIG. 6) directly back to the engine or other source of heat. When the cooling liquid is thereby quickly heated up to the desired operating temperature range, the valve skirts 34 lift from the ring seats 31 and if and when the upper limit of the desired operating temperature range is reached, the valve skirts 34 will be closed their seating on the post-supported seats 126 (see FIG. 7). Under such conditions, the flow from the chests 140 through the ring seats 31 is into the spaces between the side walls 124 and 124' and partition sections 136 and 138, respectively, and thence to the heat-exchanger through the opening of the flange 112.

A particular advantage of the embodiment shown in FIGS. 5 to 8 is that, except in situations where the pipes or conduits to which the valve is connected are poorly engineered and locate one or both chests too close to another pipe, an engine block, or other obstruction, periodic inspections, repairs, and replacements are very quickly and simply achieved by merely unbolting the side chests 140. The clusters of valve elements may then be removed for inspection of them and the interior of the valve and replacement of the valve elements may be quickly made if required or advisable. Thus, normally such servicing of valves (as is normally part of the regular maintenance scheduled for locomotive, ship, or power plant diesels, for example) never requires that the valves "be taken out of the lines", i.e., disconnected at the flanges; for larger valves especially, such disconnections of the flanges are time-consuming operations which must be very carefully performed.

This invention is not limited to the specific embodiments described above but may be further modified and altered by those having expected skill in the art without departing from the scope of the following claims. For example, in order to obtain for smaller single cluster valves the relatively normal certainty of being able to inspect the valve and replace stock thermostatic valve elements by simply removing a side chest and not having to disconnect the flanged or other connection to the piping or conduits therefor — as is achieved in the embodiments shown in FIGS. 5 to 8 — one may replace the inlet nozzle 14 of the embodiment of FIGS. 1 to 4 with an appropriate side chest, in effect rotate the main body 90° and attach or cast integrally with the main body 11 an inlet nozzle portion leading to the side chest. It is also to be noted that the deck of the side chest, as shown in FIG. 8, provides ample room for an offset cluster or more than four valve elements, and, thus, for still larger valves, more elements may be accommodated in a cluster carried by one side chest by drilling an arrangement of more holes in the deck, side walls of the valve body, and its internal longitudinal partition section, plus providing on the divider between such partition sections aligned posts to support "hot" seats for the valve elements. Therefore, without limiting this invention to other and further modifications and revisions,

What is claimed is:

1. In a thermostatic valve utilizing stock temperature-responsive valve element means comprised of a stem, a ring seat carried by the stem, and a skirted hollow head movable by a temperature-responsive element from a closed position on said ring seat to an open position, a main valve body provided with alternate outlet openings, a partition within said main valve body separating a first cavity within said body which leads to one outlet opening from a second cavity which leads to an alternate outlet opening, openings in said valve body and said partition to receive the skirted head of the stock valve element means, means for removably holding said valve element means in said main body, spaced means to close said skirted head when it is moved axially from the ring seat, and inlet nozzle means for directing fluid to said valve elements, the stem of said valve element being offset from the axis of said inlet nozzle means, whereby fluid entering said inlet means is diverted to the offset stem of said valve element means and said fluid may pass either between said ring seat to one of said body outlets, or through the skirted head to an alternate body outlet, or simultaneously to both outlets, depending upon the position of said skirted head, and means for disconnecting at least a portion of said inlet means from said main valve body to provide access for inspection of said valve element means.

2. A thermostatic valve as defined in claim 1 in which thermostatic valve means comprises a cluster of stock temperature-responsive valves having the construction defined and the cluster is offset from the axis of said inlet means.

3. In a valve as defined in claim 2 in which said first cavity leads to a by-pass of a heat-exchanger for fluid circulated through said valve and said second cavity leads to a heat-exchanger for cooling said fluid and the means to close said skirted head when it is moved from said ring seat comprise seats supported within the first cavity of said valve body coaxially with said skirt.

4. In a valve as defined in claim 3 in which said inlet means comprises a bell shaped inlet nozzle removably secured to said main valve body, the enlarged portion of said nozzle being substantially closed by a desk provided with holes to receive the stems of the valves in said cluster and permit fluid to pass around said stems and through said skirted head or said ring seat and means to seal said deck to said main valve body.

5. In a valve as defined in claim 4 in which the outer surface of said deck is provided with a groove of substantially the same diameter as the enlarged portion of said nozzle and the means to seal said deck is an O-ring compressed in said groove when said nozzle is secured to said main valve body.

6. A valve as defined in claim 3 in which the interior of said main valve body is provided with a partition diverting fluid flowing into said inlet means in a direction transverse to the axis of said inlet means, a chest removably secured to a side of said main valve body, a deck substantially closing said chest but provided with an opening to receive fluid diverted from said inlet means and holes to receive the stems of valves in said cluster and permit fluid diverted into said chest to pass around said stems and through said skirted head or said ring seat and means to seal said deck to said body.

7. A valve as defined in claim 6 in which said chest, closed by said deck, is substantially bowl shaped, and the outer surface of said deck is provided with a groove of substantially the same diameter as the enlarged portion of said chest and the means to seal said deck is an O-ring compressed in said groove when said chest is secured to said main valve body.

8. A valve as defined in claim 7 in which the partition within said main valve body and separating two cavities within said valve body comprises a first section parallel to one wall of said body and a second section parallel to a second wall of said body, a second chest is closed by a deck receiving diverted flow from said inlet means and directing such diverted flow around the stems of valves in a cluster carried in the second wall of said body and said second chest is removably secured to said valve body, whereby flow into said inlet means is divided between flow into said first and second chests.

9. A valve as defined in claim 8 in which said main valve body includes means to support seats spaced from the skirted heads of each valve in said clusters when said heads are seated on their respective ring seats; said supported seats closing said skirted heads when contacted by said heads after said heads have been lifted from said ring seats.

10. A valve as defined in claim 9 in which said first and second chests are removably secured to opposite walls of said valve body and removal of said chests from said walls permits inspection of said valve elements in said clusters without disconnecting said valve from the inlet thereto and the outlets thereof.

* * * * *